(12) United States Patent
Johnson

(10) Patent No.: US 12,084,828 B2
(45) Date of Patent: Sep. 10, 2024

(54) EXCAVATOR

(71) Applicant: JAYBEN-RUSSELL PTY LTD, Tasmania (AU)

(72) Inventor: Christopher Leigh Johnson, Tasmania (AU)

(73) Assignee: Jayben-Russell Pty Ltd, Tasmania (AU)

( * ) Notice: Subject to any disclaimer, the term of this patent is extended or adjusted under 35 U.S.C. 154(b) by 563 days.

(21) Appl. No.: 17/421,132

(22) PCT Filed: Jan. 8, 2020

(86) PCT No.: PCT/AU2020/050008
§ 371 (c)(1),
(2) Date: Jul. 7, 2021

(87) PCT Pub. No.: WO2020/142808
PCT Pub. Date: Jul. 16, 2020

(65) Prior Publication Data
US 2022/0081870 A1    Mar. 17, 2022

(30) Foreign Application Priority Data

Jan. 8, 2019    (AU) ................................ 2019900060

(51) Int. Cl.
*E02F 3/32*    (2006.01)
*E02F 9/08*    (2006.01)
(Continued)

(52) U.S. Cl.
CPC ............... *E02F 3/32* (2013.01); *E02F 9/085* (2013.01); *E02F 9/0858* (2013.01);
(Continued)

(58) Field of Classification Search
CPC .......................... B60Y 2200/412; E02F 9/028
See application file for complete search history.

(56) References Cited

U.S. PATENT DOCUMENTS 3,160,284 A * 12/1964 Moore ................... B62D 49/08
                                                      212/253
3,689,090 A *  9/1972 Dunaevsky ............. E02F 9/028
                                                      180/41
(Continued)

FOREIGN PATENT DOCUMENTS

JP      S50-138716      11/1975
JP      2000-309939     11/2000
(Continued)

OTHER PUBLICATIONS

International Search Report and Written Opinion for International (PCT) Patent Application No. PCT/AU2020/050008, dated Apr. 1, 2020, 8 pages.

*Primary Examiner* — James A English
(74) *Attorney, Agent, or Firm* — Sheridan Ross P.C.

(57) ABSTRACT

An excavator for use on slopes having an incline above 30 degrees, the excavator comprising an undercarriage, a propulsion system and a house rotatably mounted to the undercarriage, wherein a rigid member extends upwardly from the undercarriage, through the house and around which the house rotates, the rigid member supports a cradle to which an engine power pack is mounted within the house, the cradle allowing the engine power pack to tilt within the cradle so that it stays generally horizontal as the excavator travels over a slope.

19 Claims, 17 Drawing Sheets

(51) Int. Cl.
  *E02F 9/20* (2006.01)
  *G05D 1/00* (2006.01)
  *E02F 9/12* (2006.01)

(52) U.S. Cl.
  CPC .......... *E02F 9/2016* (2013.01); *G05D 1/0011* (2013.01); *E02F 9/121* (2013.01); *E02F 9/205* (2013.01)

(56) References Cited

U.S. PATENT DOCUMENTS

| | | | | |
|---|---|---|---|---|
| 5,368,119 | A * | 11/1994 | Nystrom | B62D 33/0617 |
| | | | | 180/89.16 |
| 5,921,337 | A * | 7/1999 | Okamoto | E21B 7/024 |
| | | | | 180/41 |
| 6,398,293 | B1 * | 6/2002 | Nystrom | B62D 33/0604 |
| | | | | 296/190.04 |
| 7,832,740 | B2 * | 11/2010 | Kim | B62D 55/116 |
| | | | | 280/6.154 |
| 10,221,541 | B1 * | 3/2019 | Colbert | B60S 9/12 |
| 2018/0347146 | A1 * | 12/2018 | Rutherford | E02F 9/123 |
| 2019/0078295 | A1 * | 3/2019 | Lamela | E02F 9/028 |

FOREIGN PATENT DOCUMENTS

| | | |
|---|---|---|
| JP | 2003-160948 | 6/2003 |
| JP | 2013-119739 | 6/2013 |
| JP | 2014-113844 | 6/2014 |

\* cited by examiner

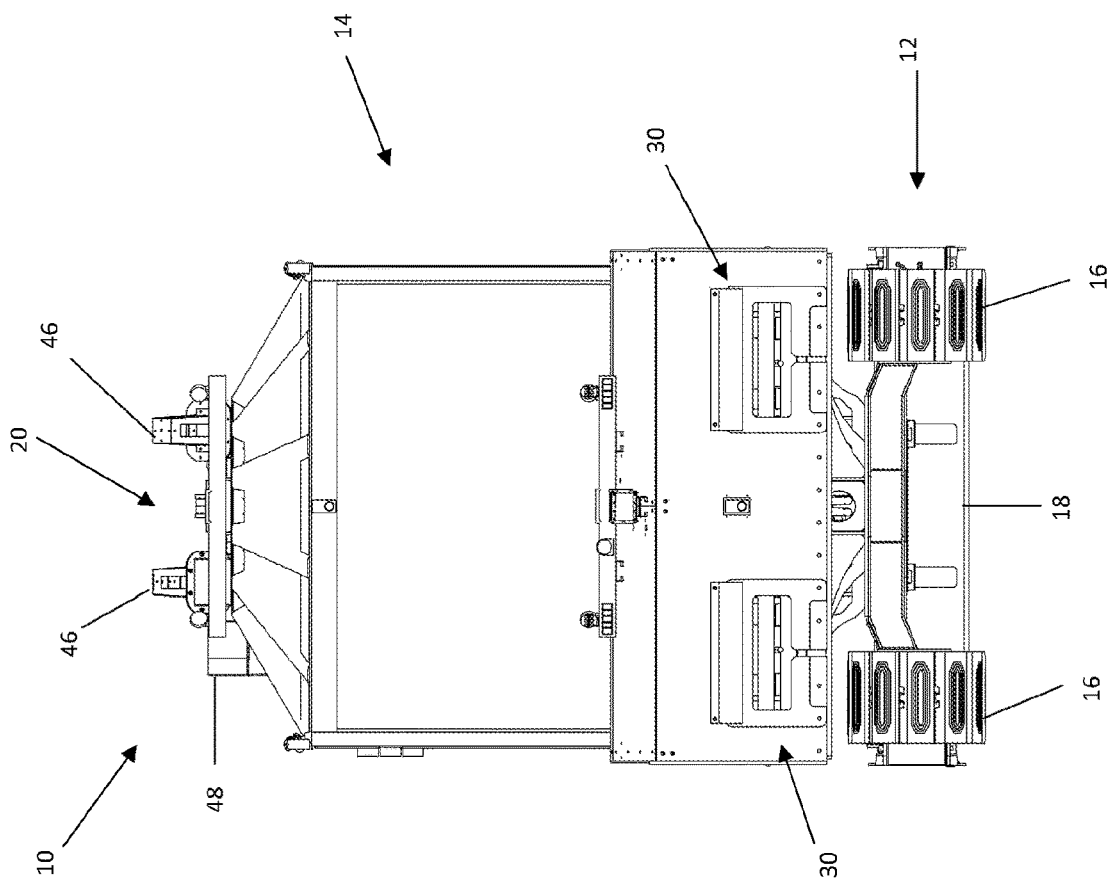
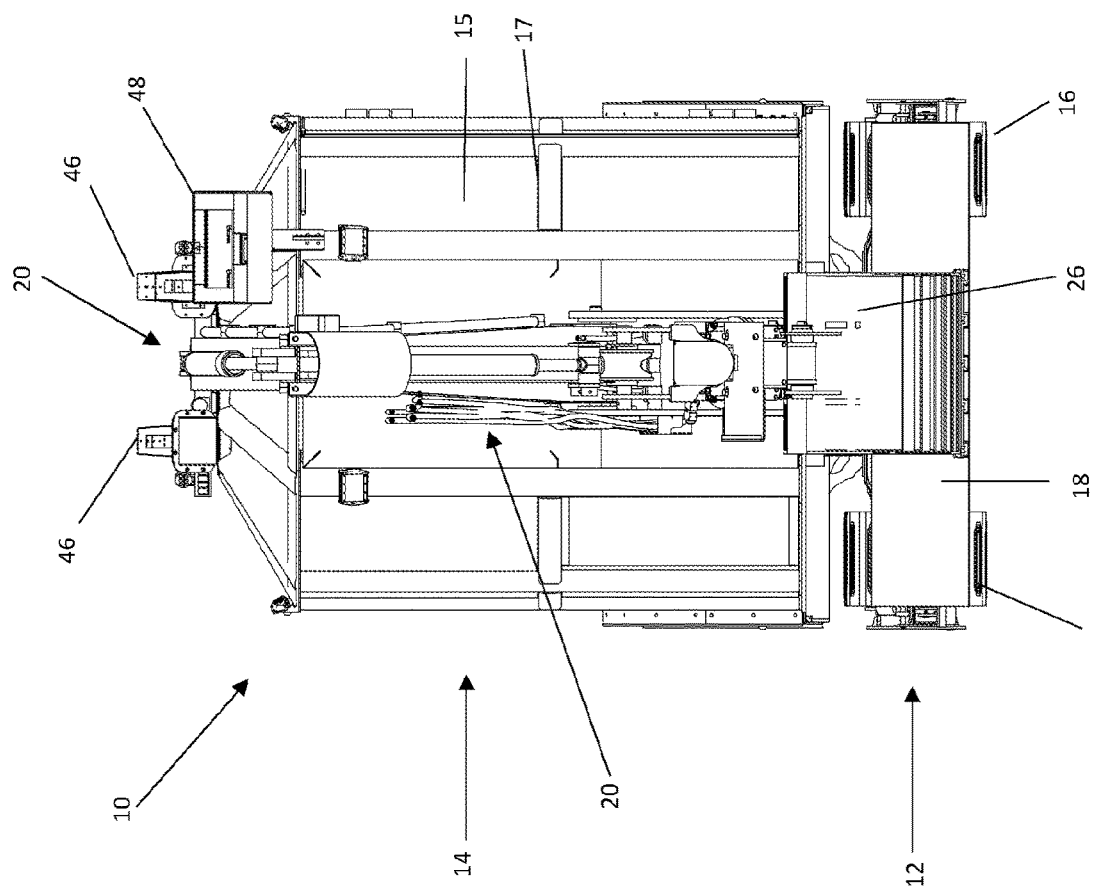

Detail D (Fig 11)

Detail C (Fig 11)

Detail G (Fig 21)

Section H-H (Fig 24)

Section J-J (Fig 23)

Section K-K (Fig 24)

Detail L (Fig 26)

Detail M (Fig 26)

EXCAVATOR

CROSS REFERENCE TO RELATED APPLICATIONS

This application is a national stage application under 35 U.S.C. § 371 and claims the benefit of PCT Application No. PCT/AU2020/050008 having an international filing date of 8 Jan. 2020, which designated the United States, which PCT application claimed the benefit of Australia Patent Application No. 2019900060 filed 8 Jan. 2019, the disclosures of each of which are incorporated herein by reference in their entireties.

FIELD OF THE INVENTION

The present invention relates to an excavator for use on highly sloped or vertical surfaces, in particular an excavator for use on surfaces having an incline above 30 degrees.

BACKGROUND

Clearing or maintenance of highly sloped ground surfaces is often required to be performed with machines such as excavators. For example, in open cut mines geological ground conditions can lead to instability and rock falls from very steep and often near vertical walls that need to be addressed with heavy machinery such as an excavator to prevent rock falls. Near vertical walls are necessary as it is desirable to provide mine walls that are as steep as possible to minimise the footprint of the mine and minimize the removal of overburden, yet such walls can be difficult to maintain with previous machines and methods. When rock falls occur, repair can be long and costly and can render parts of the mine inoperable and unsafe until the repair is complete.

Traditional excavators have typically been unsuitable for use on inclined surfaces as the diesel engines used cannot operate at high angles of inclination, i.e. typically above around 30 to 45 degrees to the horizontal. Various modifications have been proposed to traditional excavators so that they can be used at high inclination angles, and specially configured excavators have been used for tree clearing in forestry areas and road cuttings where sloped ground surfaces are common. However, previous vehicles have had limited effectiveness as the modifications made typically result in compromised slewing of the house and digging assembly.

In the absence of a suitable machine to operate on high angles of inclination, clearing or maintenance works on highly sloped surfaces are often performed manually by work crews in a cage either suspended from a long boom crane or lowered down the mine wall in a cage or suspended by abseiling. Such work is dangerous and has led to serious injuries and fatalities in the past.

There is a need to address the above, and/or at least provide a useful alternative.

SUMMARY

According to one aspect of the invention there is provided an excavator for use on slopes having an incline above 30 degrees, the excavator comprising an undercarriage, a propulsion system and a house rotatably mounted to the undercarriage,
wherein a rigid member extends upwardly from the undercarriage, through the house and around which the house rotates, the rigid member forming a cradle to which an engine power pack is mounted within the house, the cradle allowing the engine power pack to tilt within the cradle so that it stays generally horizontal as the excavator travels over a slope.

According to a preferred embodiment of the invention, the excavator further comprises a rotary union or hydraulic swivel coupled to the rigid member and mounted at an upper part of the house, the rotary union/hydraulic swivel being in fluid communication with hydraulic cylinders on the house for operating a working assembly of the excavator and configured for providing continuous slewing of the house.

Preferably, the rotary union/hydraulic swivel provides a rotatable electrical connection between the undercarriage and the house.

Preferably, the working assembly includes a boom, dipper and bucket or other implement for scaling or bench clearing activities In a preferred form, the cradle has members extending around the powerpack to ends thereof for rotational engagement with corresponding members formed on a stand on which the engine power pack is mounted. Preferably, the cradle is configured to allow tilting of the engine power pack relative to the cradle about a longitudinal axis of the engine.

The excavator can have at least one cable winch secured to the undercarriage for lowering the excavator down a steep slope or retrieving the excavator from a steep slope.

The excavator can further comprise laterally extending supports extending from either side of the undercarriage for stabilising the excavator in use.

Preferably, the excavator includes a remote-control module to enable remote operation.

According to another aspect of the invention there is provided a method of clearing an otherwise inaccessible ledge or bench, forming part of a steep wall including the steps of:
  providing an excavator of the above described type;
  lowering the excavator down the wall or onto the ledge;
  remotely operating the excavator to clear the steep wall or ledge.

Preferably, the excavator is configured for continuous slewing.

BRIEF DESCRIPTION OF THE DRAWINGS

In order that the invention may be more easily understood, an embodiment will now be described, by way of example only, with reference to the accompanying drawings, in which:

FIG. 5: is a front elevation of the excavator;

FIG. 6: is a rear elevation of the excavator;

DETAILED DESCRIPTION

Figure 1:
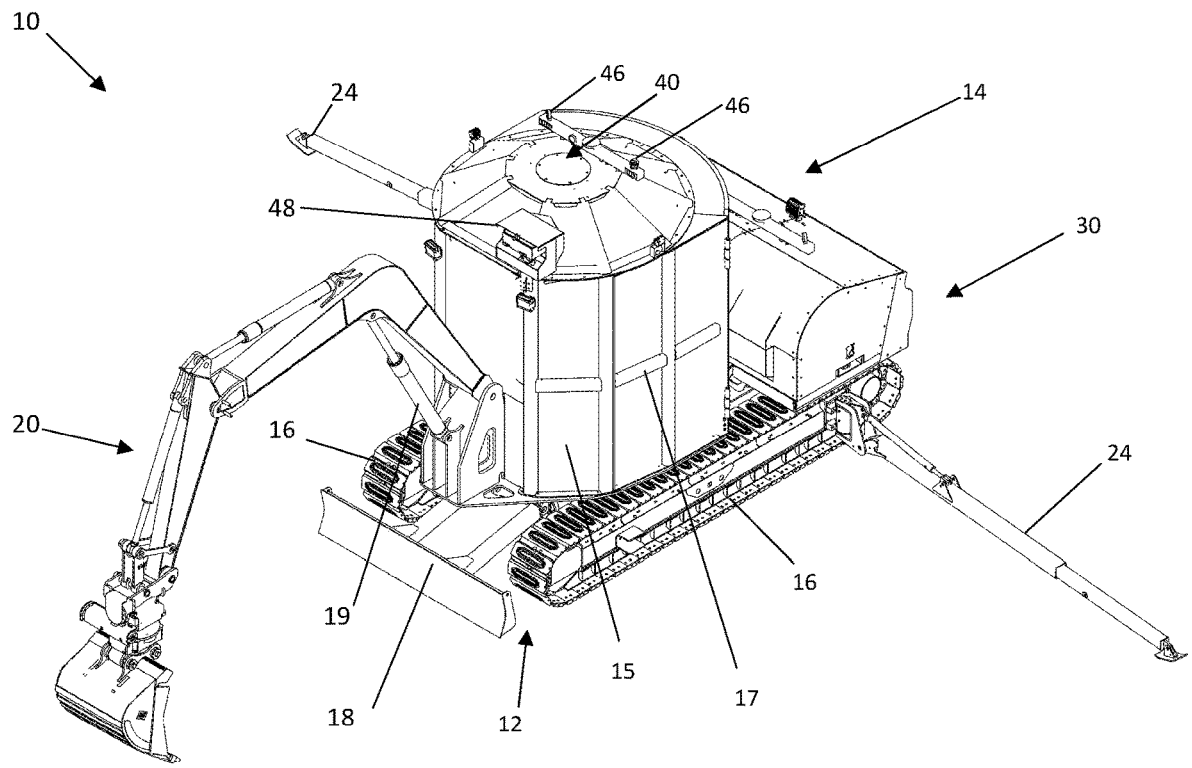
FIG. 1: is a front perspective view of an excavator according to a preferred embodiment of the invention.
Figure 2:
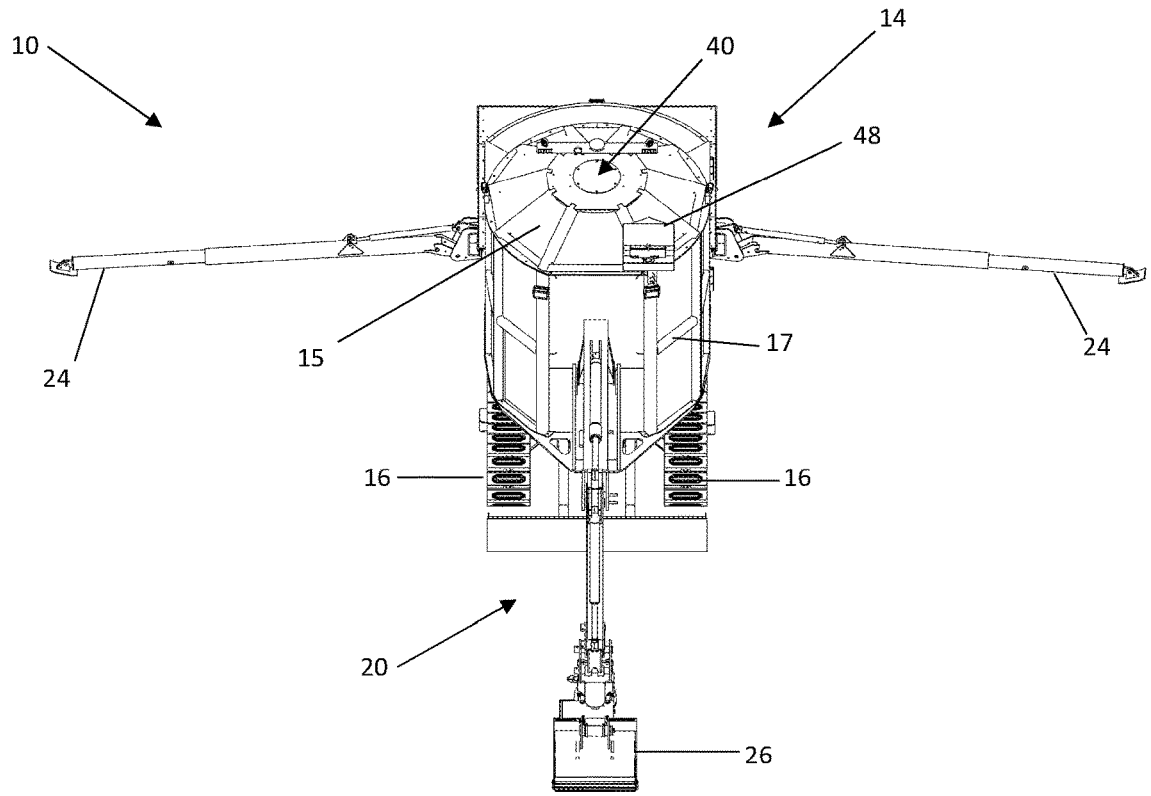
FIG. 2: is an elevated front view of the excavator.

FIGS. 1 to 6 illustrate an excavator 10 according to a preferred embodiment of the present invention. The excavator 10 is configured for use on slopes having an incline above 30 degrees, though it will be appreciated that is can also be used on horizontal surfaces or those with an incline under 30 degrees.

The excavator 10 comprises an undercarriage 12, a propulsion system (in the form of a power pack 36 discussed below) coupled thereto and a house 14 rotatably fixed to the undercarriage 12. The undercarriage 12 is largely conventional with a set of tracks 16. It can be seen that the length of each track 16 is greater than their spacing apart to enhance stability when on a wall, though in other embodiments they may also be more "square", i.e. with their length roughly equal to their spacing, as per conventional excavators. Those skilled in the art will also appreciate that although tracks are shown, a wheeled version could also be possible within the scope of the present disclosure.

Mounted to the undercarriage 12 is a blade 18, winches 30 and stabilisers 24 extending laterally from the undercarriage 12 (FIG. 2), all of which are hydraulically operated. Mounted on the house 14 is a hydraulically operated working assembly 20 (which in the illustrated embodiment includes a boom 22, dipper 28 and bucket 26—see FIG. 11) that operates in the same manner as a traditional excavator. It will be appreciated that the working assembly 20 may take other configurations and include, among other things, a jack hammer, claw, pole driver, rock drilling, rock bolting or cutting attachment for example.

It will be appreciated that the term house 14 is used as a term of the art for an upper part of an excavator. In the illustrated embodiment, the excavator 10 is configured for remote operation so the house 14 does not include a cabin for an operator, though it will be appreciated that in other embodiments, particularly those for use on slopes that are not nearly vertical, such a cabin may be provided to allow for accommodation of an operator. The illustrated house 14 includes a protective enclosure 15 that is preferably formed of replaceable steel or composite panels that are configured to minimize rock damage during use. Bracing 17 may also be provided for further protection of the house 14 and for rollover protection.

Figure 3:
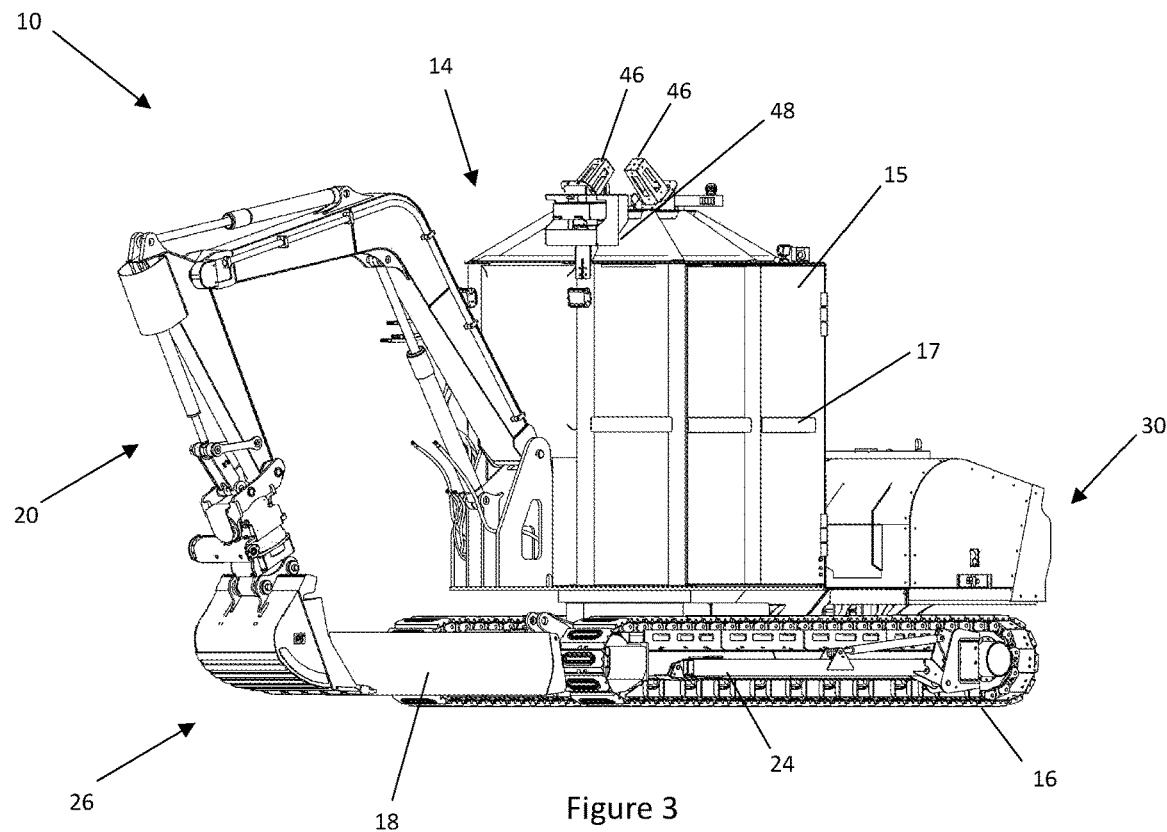
FIG. 3: is a side perspective view of the excavator.
Figure 4:
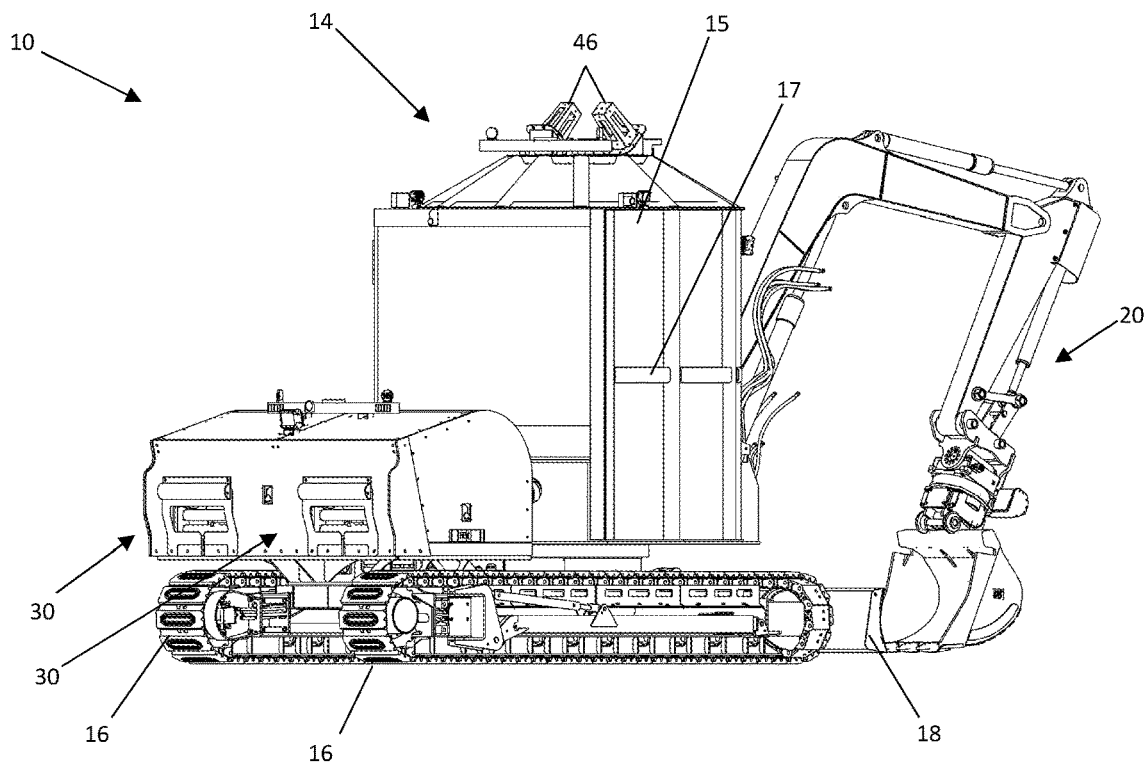
FIG. 4: is another side perspective view of the excavator.
Figure 7:
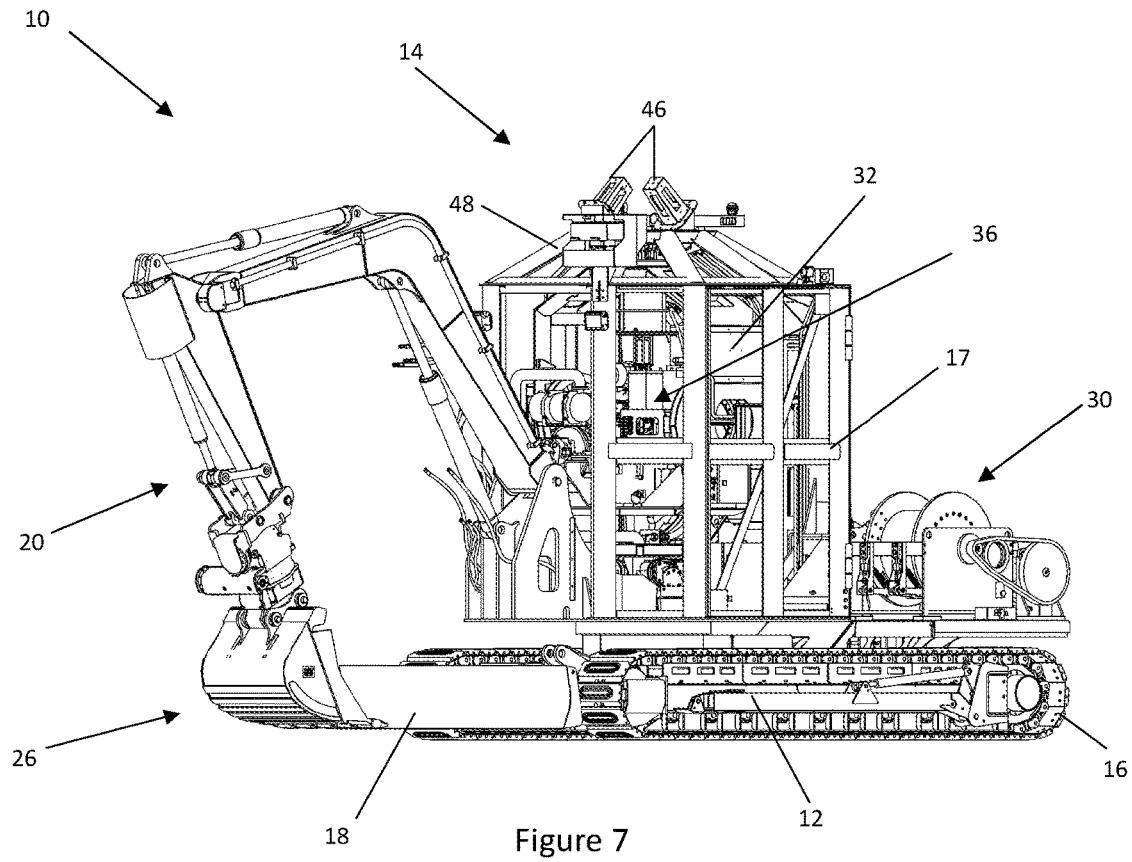
FIG. 7: is a side perspective view of the excavator with the house partially removed.
Figure 8:
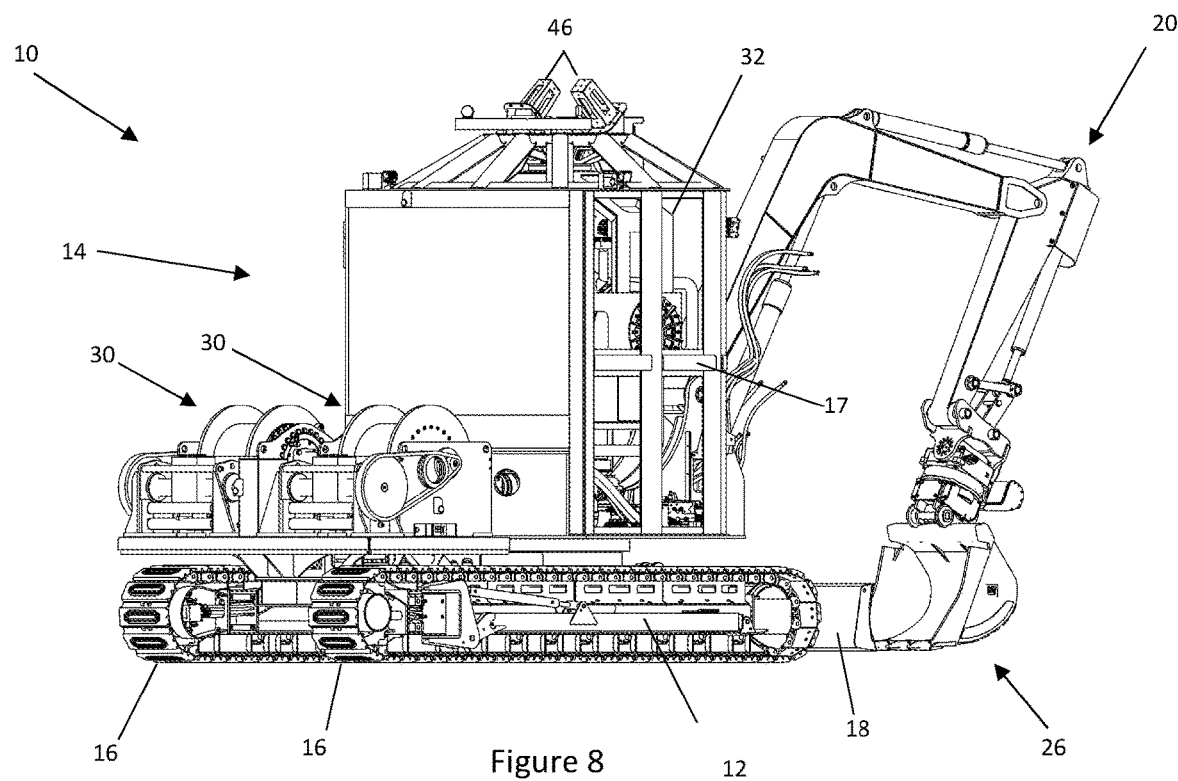
FIG. 8: is another side perspective view of the excavator with the house partially removed.
Figure 10:
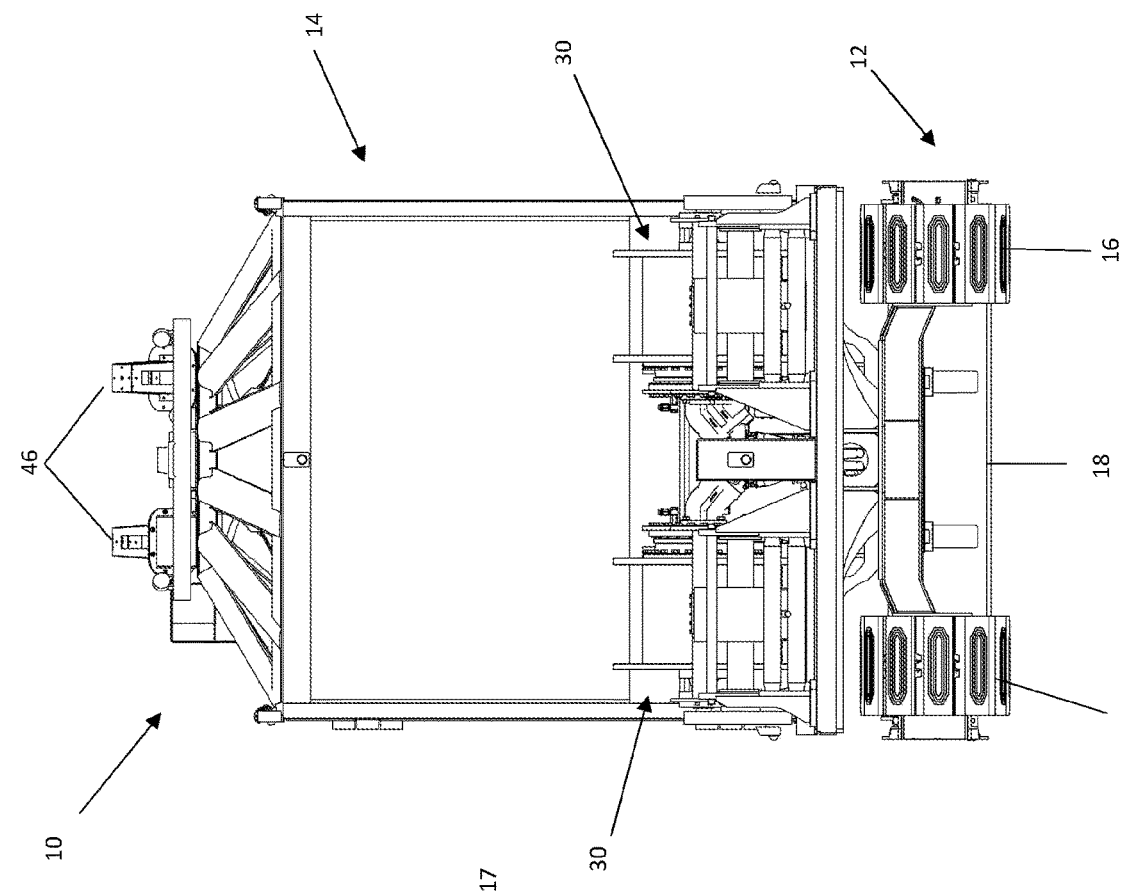
FIG. 10: is a rear elevation of the excavator with the house partially removed.
Figure 9:
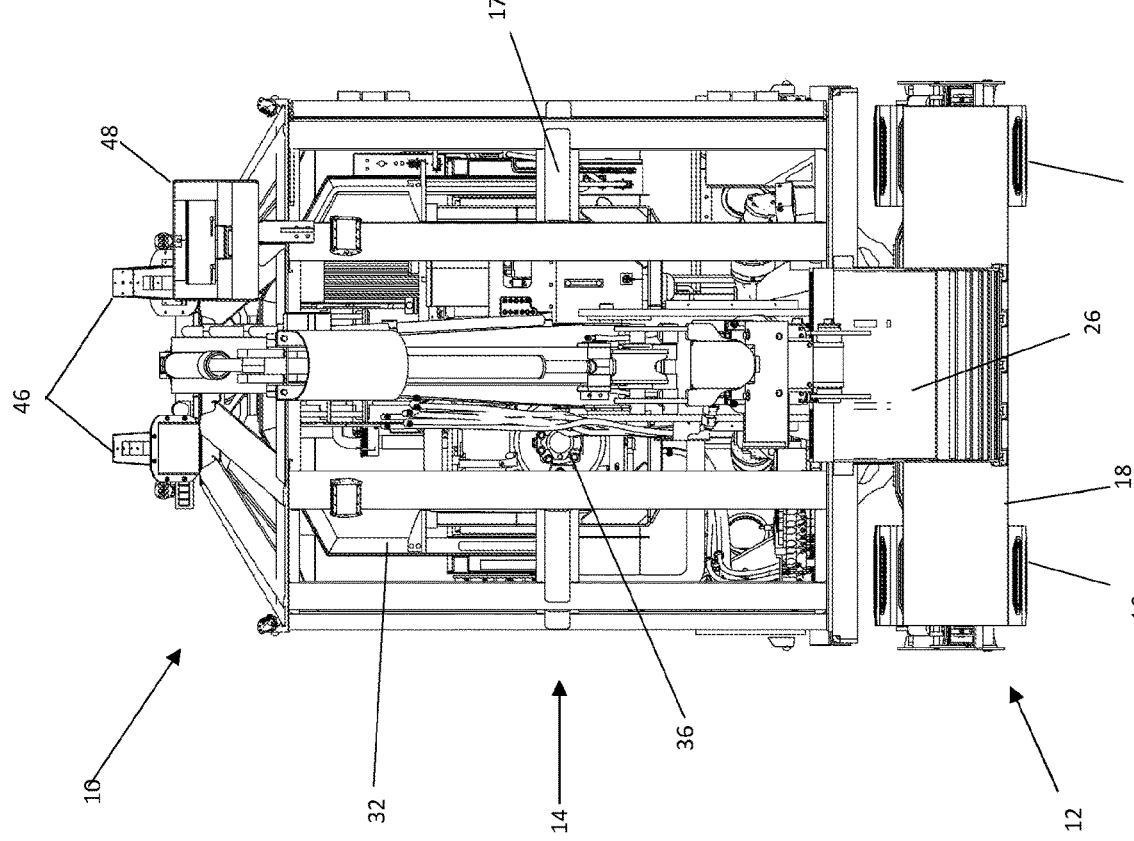
FIG. 9: is a front elevation of the excavator with the house partially removed.

As can be seen in FIG. 3 in particular, a radio antenna mount 46 and a stereoscopic camera mount 48 are provided to facilitate remote control of the excavator 10.

FIGS. 7 to 10 illustrate the excavator 10 with the protective enclosure 15 removed so that powerpack 36 mounted on rigid member 32 and within the house 14 can be seen, along with the related ancillary equipment necessary to run a machine of this type.

Figure 11:
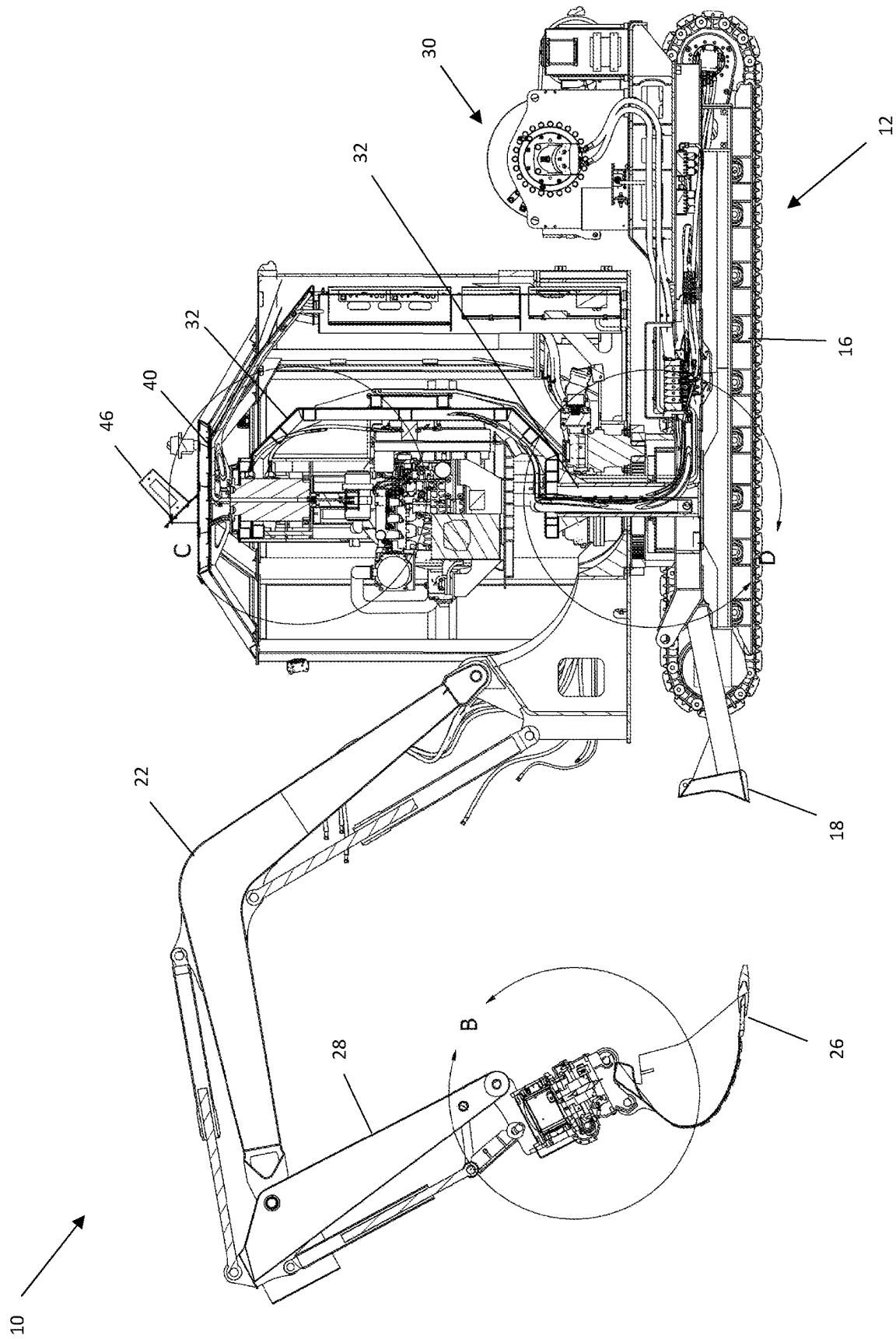
FIG. 11: is a sectioned side view of the excavator.

FIG. 11 illustrates a sectioned side view of the excavator 10 so that rigid member 32 and powerpack 36 can be seen within the house 14. The rigid member 32 is secured to the undercarriage and extends upwardly from the undercarriage 12 and through the house 14 to an upper portion of the enclosure 15. The rigid member is formed of rigid structural steel so as to have sufficient strength to support an engine power pack and extends around the power pack 36, as will be described further below. In other embodiments, the rigid member 32 may take other forms, such as for example a generally "C" shape in side view, so that a base and upper portion of the rigid member 32 are centrally mounted with respect to an axis of rotation of the house 14. The term "engine power pack" is used to describe a module which may include among other things and without limitation, an engine, hydraulic pumps, fuel tank, hydraulic oil tanks and batteries.

Figure 14:
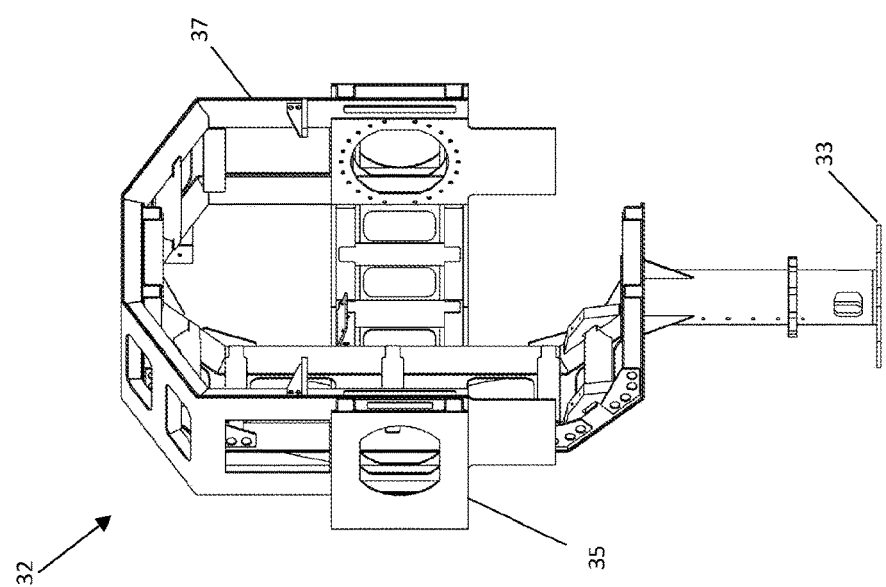
Figure 19:
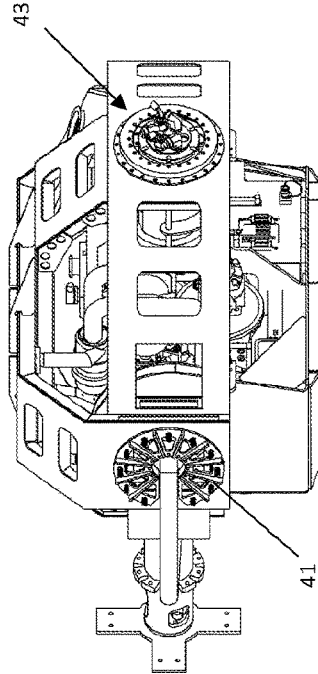
FIGS. 17 to 20: are views of a powerpack received by the rigid support member, the powerpack being in different conditions of use.
Figure 20:
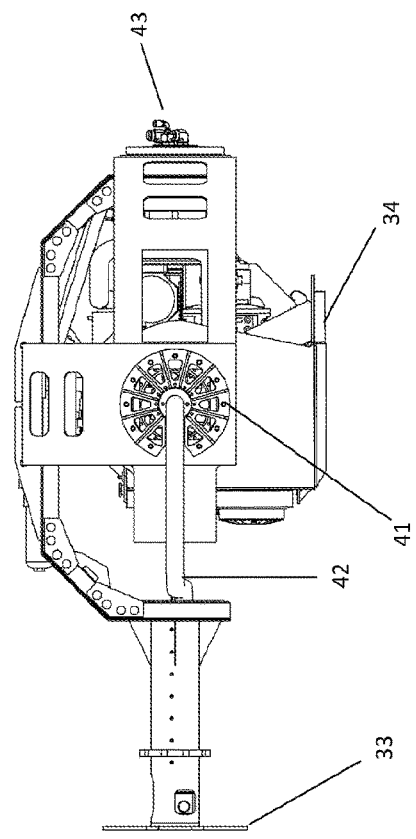
Figure 18:
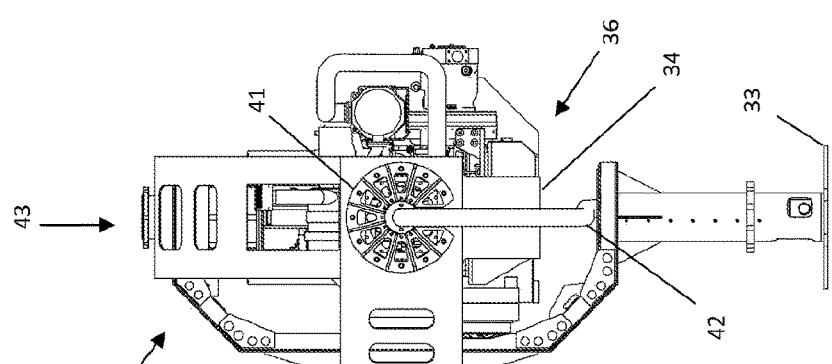
Figure 17:
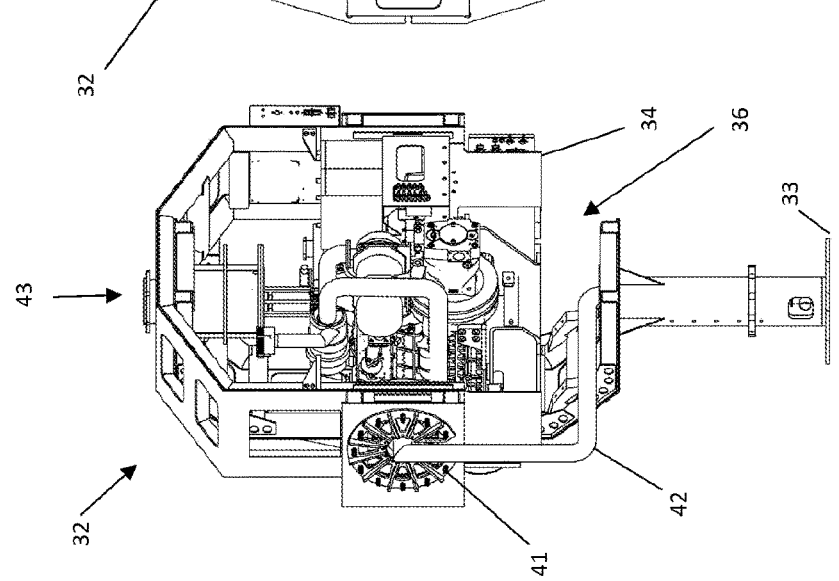
Figure 21:
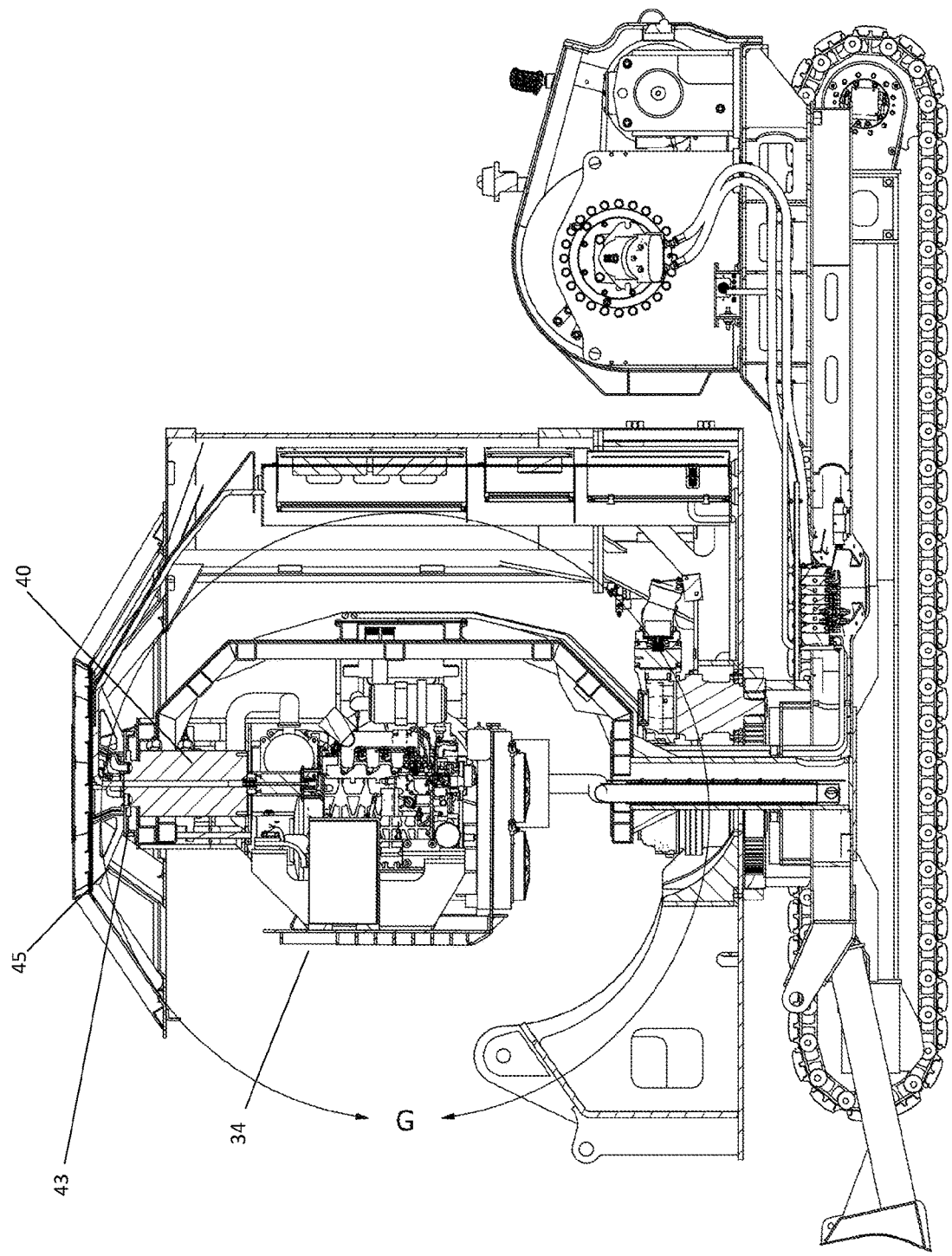
FIG. 21: is another side sectioned view of the excavator.
Figure 22:
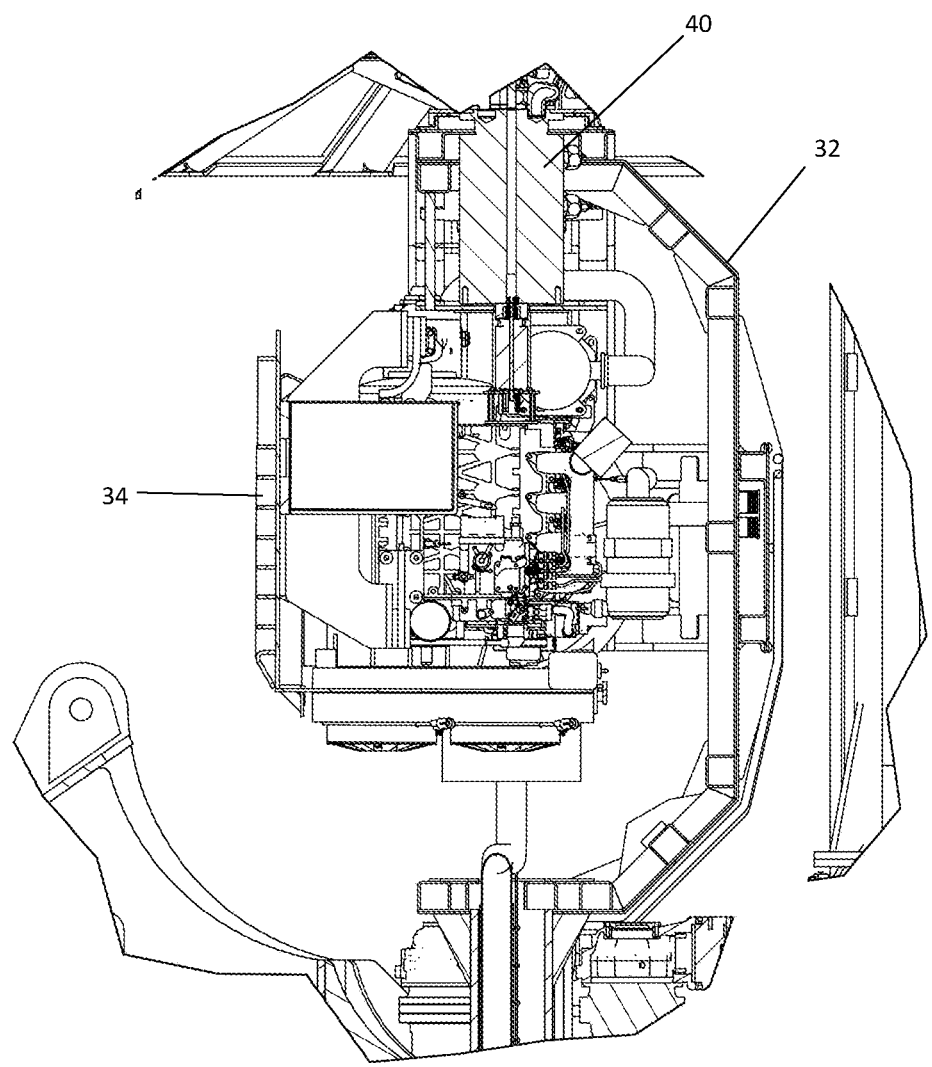
FIG. 22: is a close detailed view of FIG. 21.
Figure 23:
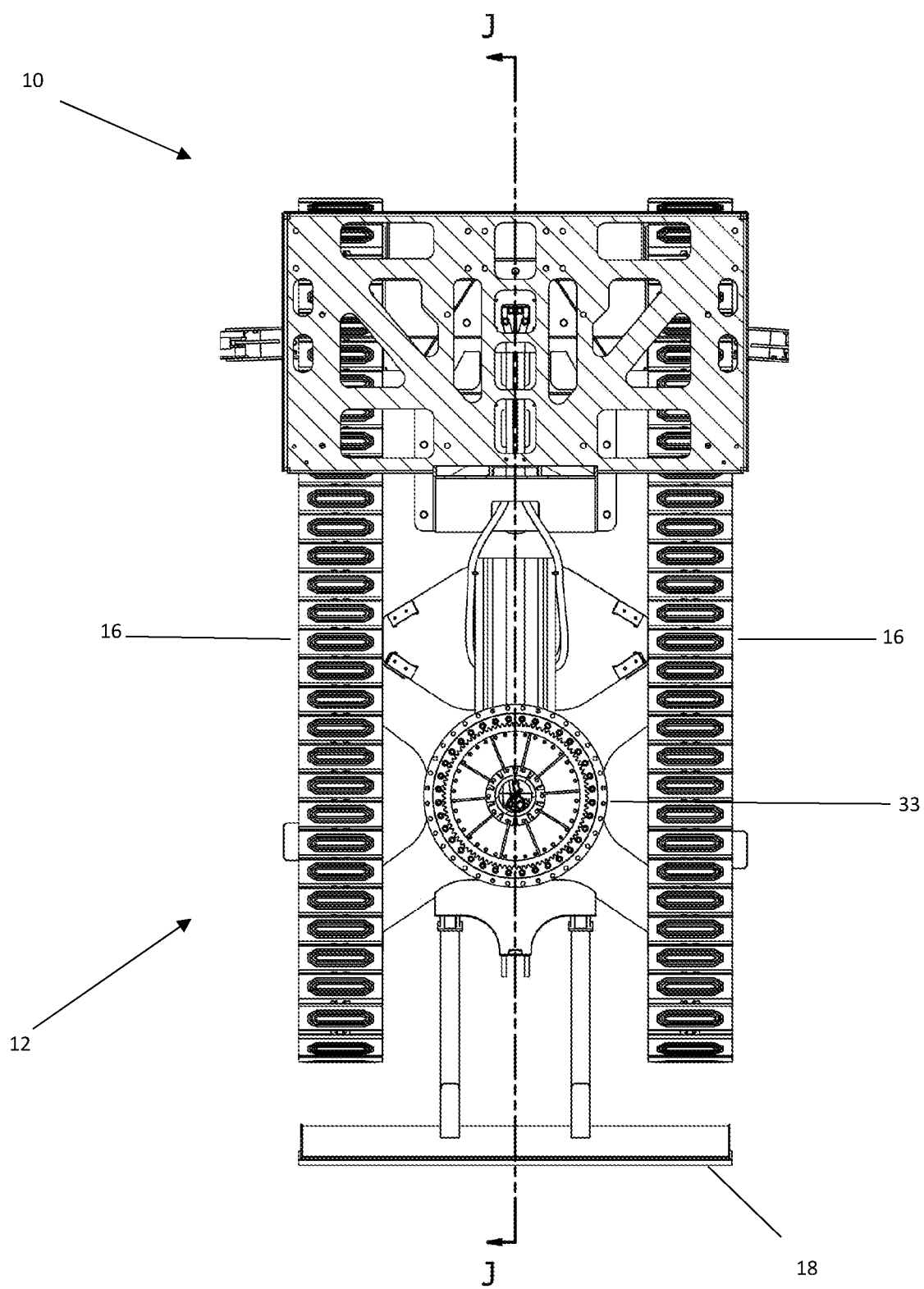
FIGS. 23 to 26: are sectional views of FIG. 24.

Secured to the undercarriage 12, there is formed ring 33 (FIG. 14), around which the house 14 can be driven to effect slewing of the working assembly 20. The rigid member 32 extends upwardly from the undercarriage 12, through the ring 33 and into the house 14 so that the house can rotate about the rigid member 32.

At a base thereof, the rigid member 32 is fixed to the undercarriage 12 and at an upper part thereof supports a rotary union or hydraulic swivel 40, which will be described further below. The excavator 10 is configured so that the house 14 rotates about the rigid member 32, which remains stationary, and the rotary union 40 is required to allow the hydraulics mounted on the house 14 to be in fluid communication with hydraulic motors on the engine power pack to operate during slewing of the house 14. In less desirable embodiments, the rotary union may be omitted, but it will be appreciated that continuous slewing will not be possible and that the house 14 will have a limited rotational range of motion that may not be a full 360 degrees as hydraulic lines and electrical cables will eventually wrap around the power pack 36.

The rotary union 40 is coupled to the rigid member 32 and mounted at an upper part of the house 14 so to provide at an upper part of the house 14 a rotating hydraulic connection between a hydraulic pump mounted on the engine power pack 36 and hydraulic cylinders 19 external of the enclosure 15 for driving the working assembly 20, tracks 16, winches 30 and any other desirable equipment. The rotary union 40 is required to be mounted in an upper part of the house 14 as it is desirable to mount the rotary union 40 as close as possible to an axis of rotation and having the rigid member 32 mounted to the undercarriage 12 means that it cannot be mounted in the base as per a traditional excavator.

The rotary union 40 is also configured to provide a rotatable electrical connection between the undercarriage 12 and the house 14 so that the house can slew continuously.

A bearing 43 is provided at an upper portion of the rigid member 32, the bearing engaging a corresponding support 45 on the house, to reduce the bending moment or lever arm effect applied to the rigid member 32 as the excavator 10 is being used on vertical or near vertical surfaces.

As the rigid member 32 is secured to the undercarriage 12, hydraulic lines for the propulsion system can be directly connected between the engine power pack and the undercarriage, provided that the engine power pack 36 is not free to continuously rotate in the cradle. In contrast, on conventional excavators having a motor and hydraulic pump that moves with the cab, a rotary union is provided in the base of the house to provide continuous slewing.

At least one slew motor (not shown) is provided on the undercarriage 12 and is preferably internally geared so as to reduce its size and not interfere with the rigid member 32. In a preferred embodiment, three equi-spaced slewing motors are provided to overcome the additional force required to slew a house 14 and working assembly 20 that is working on a vertical or near vertical wall. In this regard, as the house 14 slews, movement of the working assembly 20 will be against gravity and require additional force over the type of motors used for previous excavators.

Figure 13:
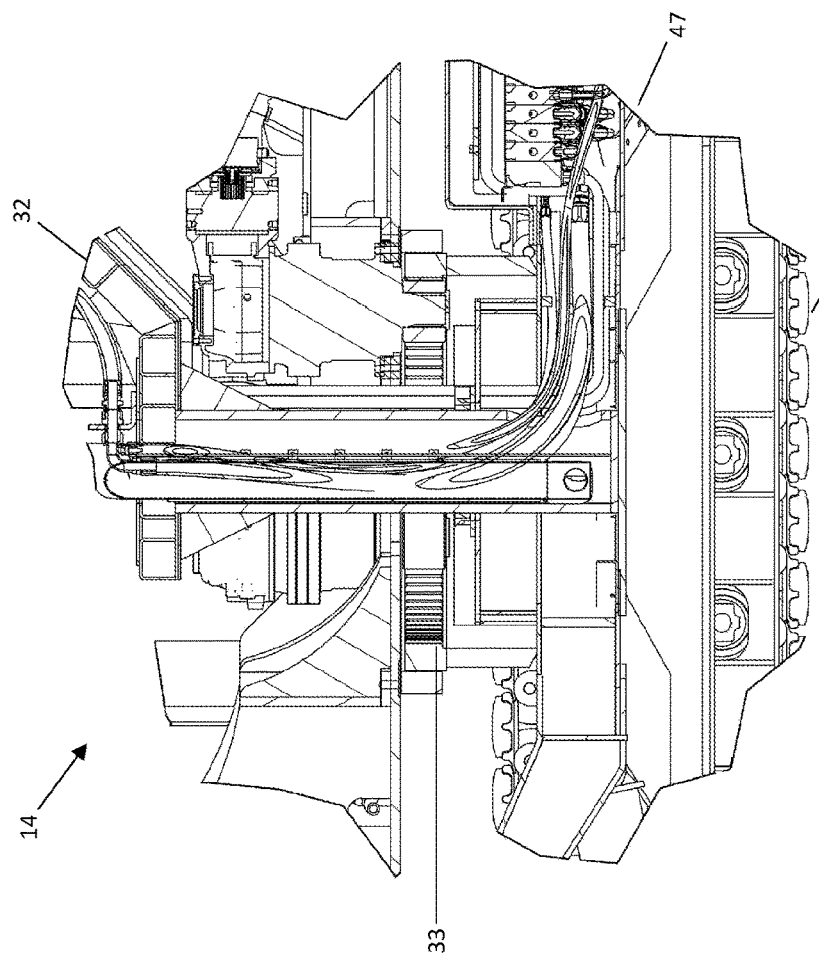
FIGS. 12 & 13: are close detail views of the excavator of FIG. 11.
Figure 12:
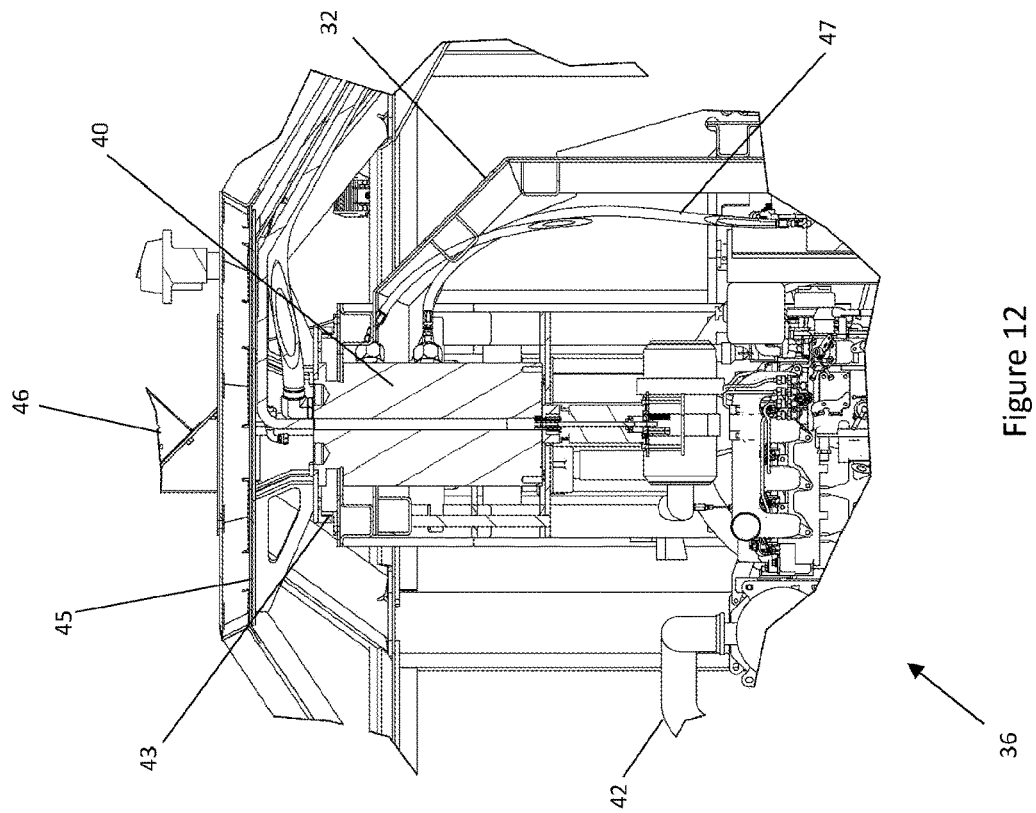
Figure 16:
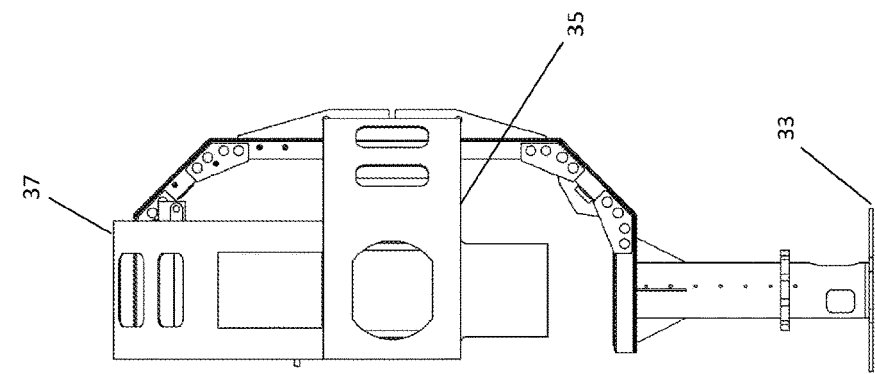
FIGS. 14 to 16: are respective perspective, front and side views of a rigid support member.
Figure 15:
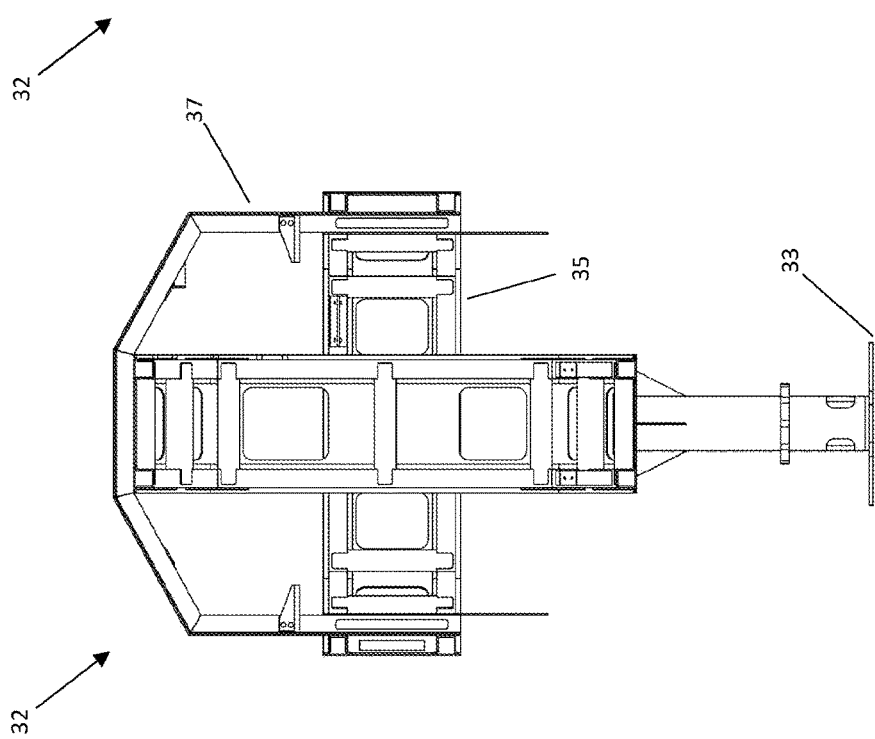

As illustrated in FIGS. 12 and 13, hydraulic hoses 47 run from the undercarriage 12, along the outside of the rigid member 32 to the rotary union 40 so as to be in fluid communication with the engine power pack 36.

With reference to FIGS. 17 to 25, it can be seen that the rigid member 32 supports a cradle 34 to which an engine power pack 36 is mounted about a longitudinal axis thereof. The rigid member 32 includes a lateral member 35 and a vertical member 37, each of which in side view takes a generally 'C' shape so as to extend around the power pack 36 and provide sufficient stiffness to support the power pack 36 as it tilts/rotates through various angles.

Figure 24:
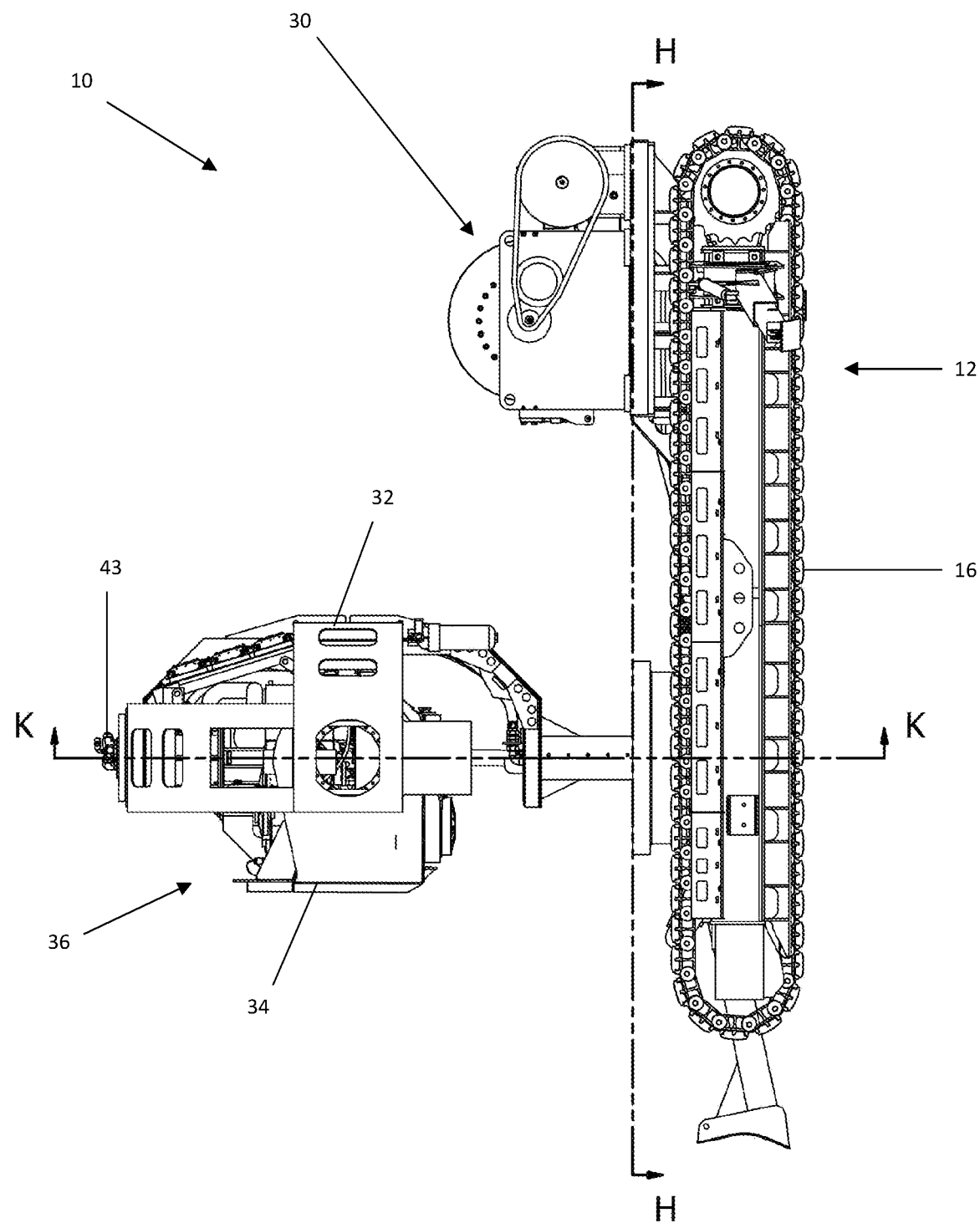
Figure 25:
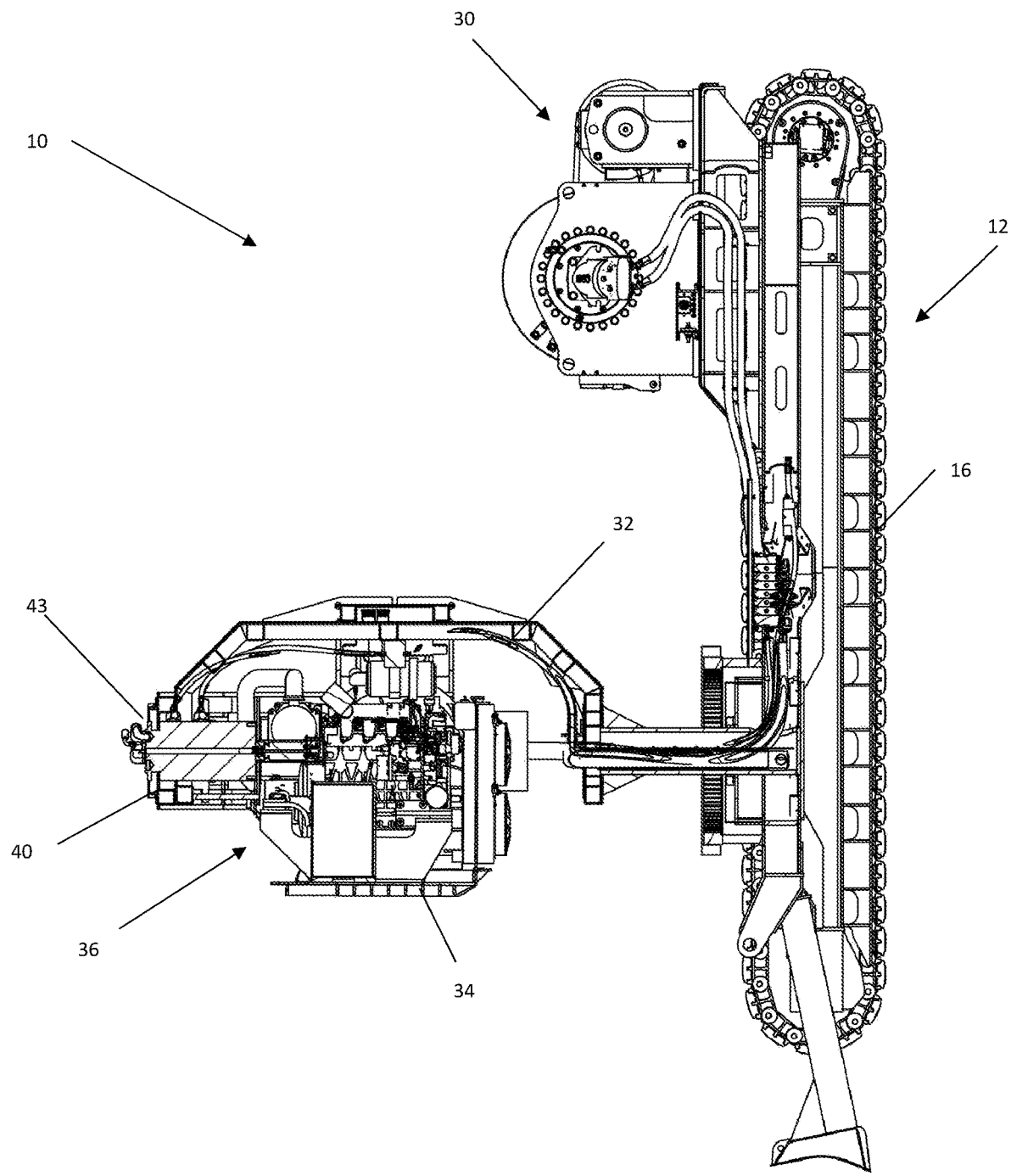

The powerpack 36 is rotatably supported by the cradle 34 which allows the rigid member 32 to tilt while the engine power pack remains generally horizontal, as can be seen in FIGS. 24 and 25. This allows the excavator 10 to be used on surfaces with high angles of inclination or vertical walls as the engine power pack can remain generally horizontal and certainly within a range of allowable operating angles for diesel engines.

Powerpack 36 is mounted on a support cradle 34, which is provided with bearings 41 at ends thereof for rotational engagement with corresponding members formed on the rigid member 32.

To ensure smooth movement, the rigid member 32 can be provided with bearings 41 (FIGS. 17 and 20) to allow the engine power pack 36 to smoothly tilt so that it stays generally horizontal as the excavator travels over a slope. Rotational stops may also be provided to limit engine power pack movement and prevent the engine power pack flipping over if large changes in angle are suddenly experienced.

Figure 26:
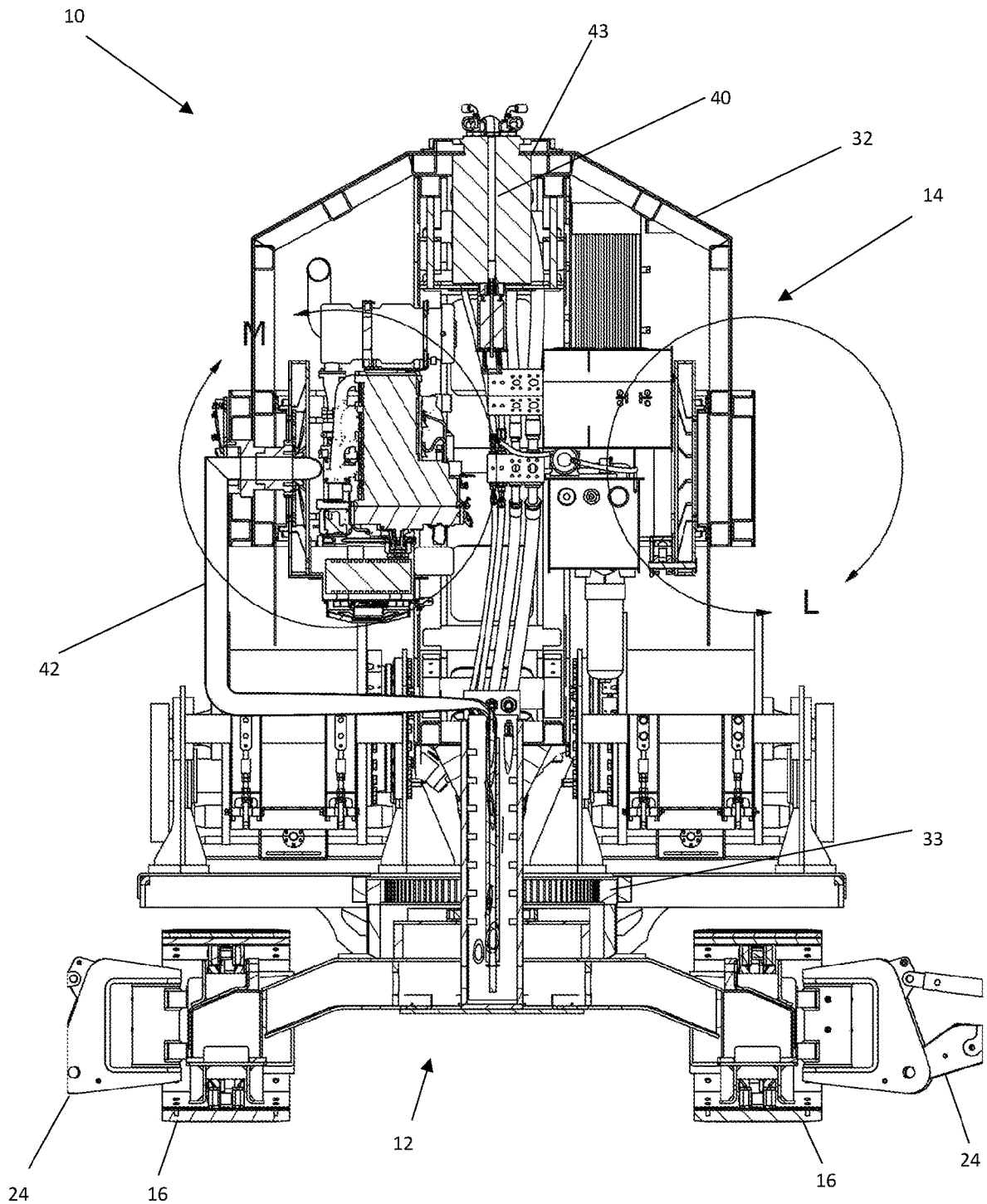
Figure 28:
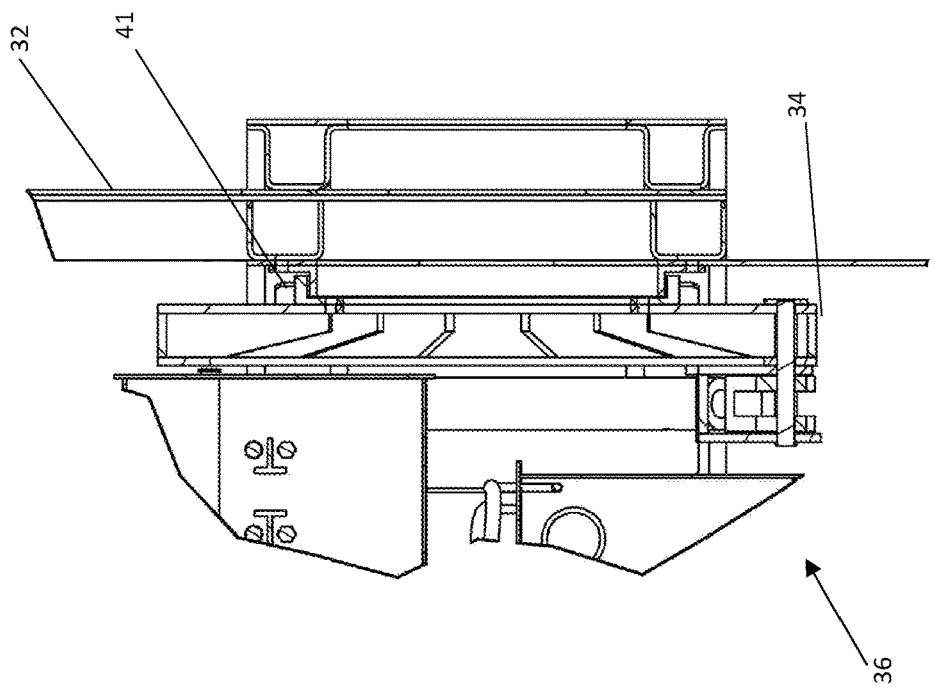
FIGS. 27 and 28: are close detail views of FIG. 26.
Figure 27:
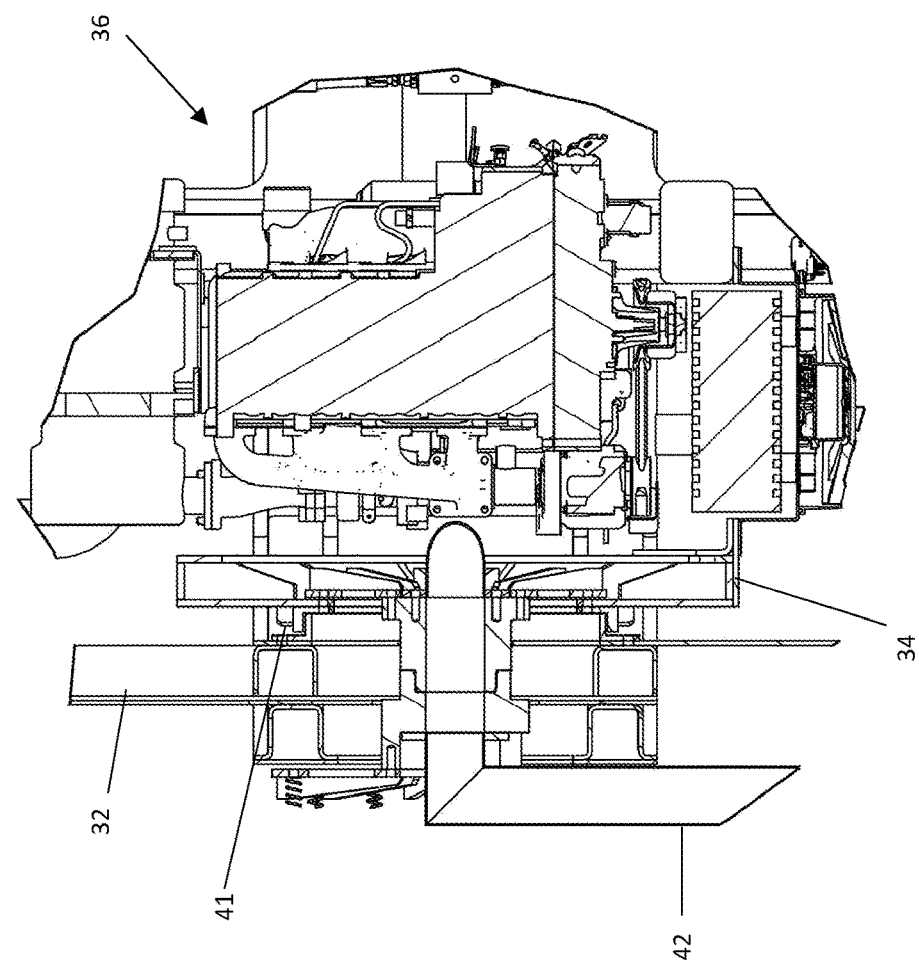

As illustrated in FIGS. 26 and 27, the above described cradle system 34 will allow the engine power pack to freely rotate as the excavator 10 is lowered down a mine wall and that tilting of the excavator 10 is limited to movement about a longitudinal axis. In other embodiments, a dual mounting system that allows for rotation of the rigid member 32 may be used to allow for lateral tilting of the excavator 10 to be accommodated without undue tilting of the engine power pack.

The engine 36 may be fitted with a rotary seal (not shown) to allow exhaust system 42 to travel out through the engine power pack bearings 41 (see FIG. 26) and the cradle 34 to extend through the lower part of the rigid member 32 and into the atmosphere.

FIGS. 21, 22 24 and 25 illustrate different sections/details of the excavator 10 when in a vertical or near vertical condition.

Figure 30:
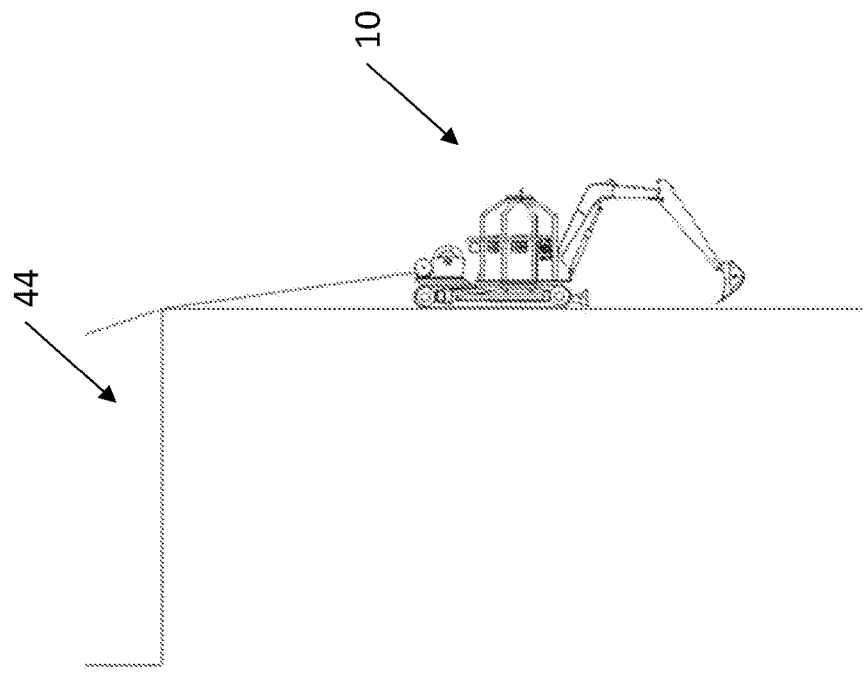
FIG. 30: is a close view of FIG. 29.
Figure 29:
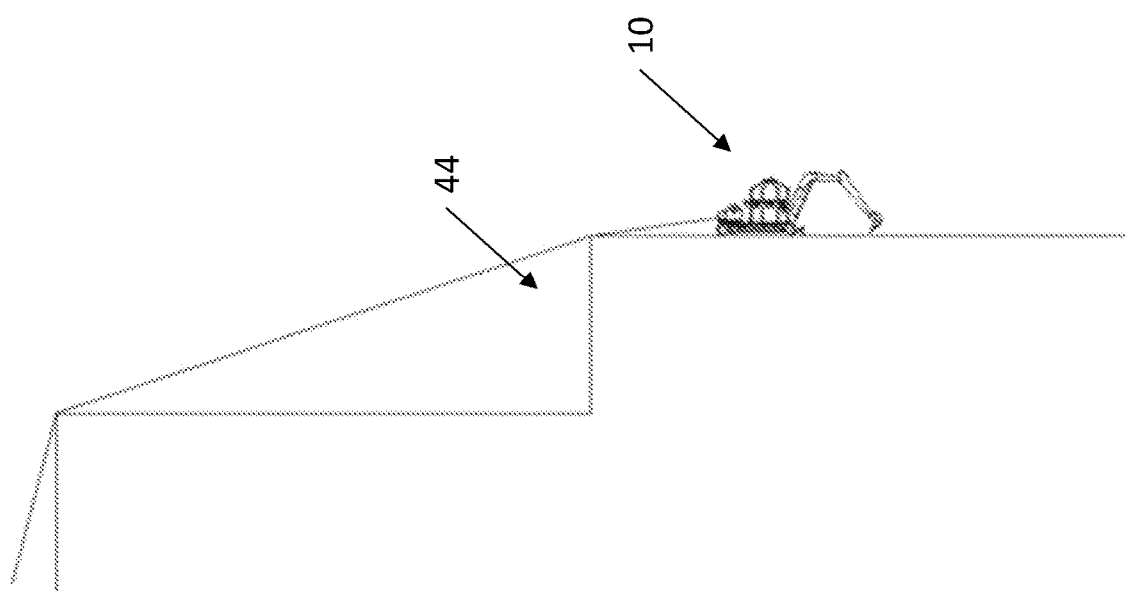
FIG. 29: is a side view of the excavator traversing a mine wall with vertical sections being separated by a horizontal section or bench.

As illustrated in FIGS. 29 and 30, in use the excavator 10 is lowered down a steep wall, which may be a mine wall, but it could also be another steep cutting, using the cable winches 30. The laterally extending stabilizers 24 are preferably telescopic and may be used to stabilise the excavator and also to prevent rotation/spinning or rolling along a wall if completely suspended or to provide self-righting if the excavator moves onto its side.

As the excavator 10 moves down the steep wall, the bucket can be used to dislodge unstable sections of rock. Although it is preferable that any digging occur below the excavator to prevent rocks falling on the excavator, continuous slewing allows the excavator to work above and below its position on the mine wall as required.

As the excavator 10 finishes work on the steep wall, it can be lowered further onto a bench or ledge 44 shown in FIGS. 29 and 30 to clear rocks fallen on the ledge 44. Such a ledge maybe otherwise be inaccessible or otherwise difficult to access. To move the excavator from the mine wall to the ledge, i.e. a generally vertical position to a generally horizontal position, it may be necessary to operate the tracks 16, digging assembly 20 and/or the lateral stabilisers 24 either alone or in combination. Once on the ledge 44, the excavator 10 can operate as a conventional excavator to clear, repair or reinstate the ledge as required.

The excavator 10 is provided with a remote control module to enable remote operation, thereby removing the need for a human operator on the excavator and minimising the likelihood for injury in such a high risk task. The remote control module can use conventional wireless protocols for the transmission of data between a remote user and the machine. Preferably, data relating to machine condition and performance is transmitted to the remote user to enable them to monitor the status of the machine.

A deployment vehicle may be provided to assist with transporting the excavator 10 and to provide a convenient method of moving the excavator from a ledge and onto a vertical wall, and also to provide an anchor and table support base while the excavator is in use.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

What is claimed is:

1. An excavator for use on slopes having an incline above 30 degrees, the excavator comprising:
   an undercarriage;
   a propulsion system;
   a house rotatably mounted to the undercarriage; and
   a rotary union or hydraulic swivel,
   wherein a rigid member extends upwardly from the undercarriage, through the house and around which the house rotates, the rigid member supports a cradle to which an engine power pack is mounted within the house, the cradle allowing the engine power pack to tilt within the cradle so that the engine power pack stays generally horizontal as the excavator travels over a slope, and
   wherein the rotary union or hydraulic swivel are coupled to the rigid member and mounted at an upper part of the house, the rotary union or hydraulic swivel being in fluid communication with hydraulic cylinders on the house for operating a working assembly of the excavator and configured for providing continuous slewing of the house.

2. An excavator according to claim 1, wherein the rotary union/hydraulic swivel provides a rotatable electrical connection between the undercarriage and the house.

3. An excavator according to claim 1, wherein the working assembly includes a boom, a dipper and a bucket.

4. An excavator according to claim 1, wherein the rigid member has members extending around the engine power pack to ends thereof for rotational engagement with corresponding members formed on the cradle on which the engine power pack is mounted.

5. An excavator according to claim 1, wherein the cradle is configured to allow tilting of the engine power pack relative to the rigid support member about a longitudinal axis of the engine power pack.

6. An excavator according to claim 1, further comprising at least one cable winch secured to the undercarriage for lowering or retrieving the excavator down a steep slope.

7. An excavator according to claim 1, further comprising lateral stabilizers extending from either side of the undercarriage for stabilizing the excavator in use.

8. An excavator according to claim 1, including a remote-control module to enable remote operation.

9. A method of clearing a steep wall or inaccessible ledge, including the steps of:
   providing an excavator according to claim 1;
   lowering the excavator down the wall or onto the ledge; and
   remotely operating the excavator to clear the steep wall or ledge.

10. A method according to claim 9, wherein the excavator is configured for continuous slewing.

11. An excavator for use on slopes having an incline above 30 degrees, the excavator comprising:
    an undercarriage;
    a propulsion system; and
    a house rotatably mounted to the undercarriage,
    wherein a rigid member extends upwardly from the undercarriage, through the house and around which the house rotates, the rigid member supports a cradle to which an engine power pack is mounted within the house, the cradle allowing the engine power pack to tilt within the cradle so that the engine power pack stays generally horizontal as the excavator travels over a slope, and
    wherein the rigid member has members extending around the engine power pack to ends thereof for rotational engagement with corresponding members formed on the cradle.

12. An excavator according to claim 11, wherein the cradle is configured to allow tilting of the engine power pack relative to the rigid support member about a longitudinal axis of the engine power pack.

13. An excavator according to claim 11, further comprising at least one cable winch secured to the undercarriage for lowering or retrieving the excavator down a steep slope.

14. An excavator according to claim 11, further comprising lateral stabilizers extending from either side of the undercarriage for stabilizing the excavator in use.

15. An excavator according to claim 11, including a remote-control module to enable remote operation.

16. An excavator according to claim 11, further comprising a rotary union or hydraulic swivel coupled to the rigid member and mounted at an upper part of the house, the rotary union or hydraulic swivel being in fluid communication with hydraulic cylinders on the house for operating a working assembly of the excavator and configured for providing continuous slewing of the house.

17. An excavator according to claim 16, wherein the rotary union/hydraulic swivel provides a rotatable electrical connection between the undercarriage and the house.

18. A method of clearing a steep wall or inaccessible ledge, including the steps of:
    providing an excavator according to claim 11;
    lowering the excavator down the wall or onto the ledge; and
    remotely operating the excavator to clear the steep wall or ledge.

19. A method according to claim 18, wherein the excavator is configured for continuous slewing.

\* \* \* \* \*